(12) United States Patent
Li et al.

(10) Patent No.: US 11,144,893 B2
(45) Date of Patent: Oct. 12, 2021

(54) METHOD AND SYSTEM FOR SECURING SMART CONTRACTS IN BLOCKCHAINS

(71) Applicant: NEC Laboratories Europe GmbH, Heidelberg (DE)

(72) Inventors: Wenting Li, Heidelberg (DE); Ghassan Karame, Heidelberg (DE); Lucas Davi, Essen (DE)

(73) Assignee: NEC CORPORATION, Tokyo (JP)

( * ) Notice: Subject to any disclaimer, the term of this patent is extended or adjusted under 35 U.S.C. 154(b) by 185 days.

(21) Appl. No.: 15/897,170

(22) Filed: Feb. 15, 2018

(65) Prior Publication Data
US 2019/0130368 A1  May 2, 2019

Related U.S. Application Data

(60) Provisional application No. 62/578,581, filed on Oct. 30, 2017.

(51) Int. Cl.
| | |
|---|---|
| *G06Q 20/06* | (2012.01) |
| *G06Q 20/40* | (2012.01) |
| *G06Q 20/38* | (2012.01) |
| *G06Q 20/02* | (2012.01) |

(52) U.S. Cl.
CPC .............. *G06Q 20/06* (2013.01); *G06Q 20/02* (2013.01); *G06Q 20/389* (2013.01); *G06Q 20/3825* (2013.01); *G06Q 20/3829* (2013.01); *G06Q 20/38215* (2013.01); *G06Q 20/4016* (2013.01); *G06Q 2220/00* (2013.01)

(58) Field of Classification Search
CPC . G06Q 20/06; G06Q 20/3825; G06Q 20/4016
USPC .......................................................... 705/44
See application file for complete search history.

(56) References Cited

U.S. PATENT DOCUMENTS

| | | | |
|---|---|---|---|
| 2016/0300060 A1 | 10/2016 | Pike et al. | |
| 2017/0177855 A1* | 6/2017 | Costa Faidella | H04L 9/3236 |
| 2017/0279774 A1* | 9/2017 | Booz | G06Q 20/123 |
| 2017/0352012 A1* | 12/2017 | Hearn | G06Q 50/18 |
| 2017/0353309 A1* | 12/2017 | Gray | H04L 9/3239 |
| 2018/0005186 A1* | 1/2018 | Hunn | G06F 40/103 |
| 2018/0374037 A1* | 12/2018 | Nazzari | G06F 21/64 |

(Continued)

FOREIGN PATENT DOCUMENTS

| | | | | |
|---|---|---|---|---|
| EP | 3629269 A1 * | 4/2020 | | G06Q 50/00 |

OTHER PUBLICATIONS

Loi Luu, et al., "Making Smart Contracts Smarter", Proceedings of the 2016 ACM SIGSAC conference on Computer and Communications Security, ACM, Oct. 24-28, pp. 1-16 (Year: 2016).*

(Continued)

*Primary Examiner* — Christopher Bridges
*Assistant Examiner* — Yongsik Park
(74) *Attorney, Agent, or Firm* — Leydig, Voit & Mayer, Ltd.

(57) ABSTRACT

A method for securing smart contracts in a blockchain includes receiving in the blockchain a contract creation transaction having a control flow graph (CFG) and contract code for a smart contract to be created. The contract creation transaction is verified by checking a signature of a creator of the smart contract and determining that the CFG is correct based on the contract code. The verified contract creation transaction is included as a block in a distributed ledger of the blockchain.

20 Claims, 3 Drawing Sheets

(56) References Cited

U.S. PATENT DOCUMENTS

2020/0119905 A1* 4/2020 Revankar ......... G06Q 20/38215
2020/0234386 A1* 7/2020 Blackman ............. H04L 9/0894

OTHER PUBLICATIONS

Martin Abadi, et al., "Control-Flow Integrity Principles, Implementations, and Applications", ACM Transactions on Information and Systems Security, vol. 13, No. 1, article 4, Oct. 2009, pp. 1-40 (Year: 2009).*
Loi Luu et al: "Making Smart Contracts Smarter", Computer and Communications Security, Oct. 28, 2016 (Oct. 28, 2016), pp. 254-269, XP055571330.
Martin Abadi et al: "Control-flow integrity principles, implementations, and applications", ACM Transactions on Information and System Security, ACM, New York, NY, US, vol. 13, No. 1, Oct. 1, 2009 (Oct. 1, 2009), pp. 4:1-4:40, XP001574403.
Martin Abadi, et al., "Control-Flow Integrity Principles, Implementations, and Applications", ACM Transactions on Information and Systems Security, vol. 13, No. 1, article 4, Oct. 2009, pp. 1-40.
Nathan Burow, et al., "Control-Flow Integrity: Precision, Security, and Performance", ACM Computing Survey, vol. 50, Apr. 2017, pp. 1-30.
Christian Reitwiessner, "Smart Contract Security", Ethereum Blog, Jun. 10, 2016, pp. 1-14.
Christoph Jentzsch, "Decentralized Autonomous Organization to Automate Gooverance", Oct. 10, 2016, pp. 1-31.
James C. King, "Symbolic Execution and Program Testing", Communications of the ACM, vol. 19, No. 7, Jul. 1976, pp. 1-10.
Loi Luu, et al., "Making Smart Contracts Smarter", Proceedings of the 2016 ACM SIGSAC conference on Computer and Communications Security, ACM, Oct. 24-28, pp. 1-16.
Nicola Atzei, et al., "A Survey of Attacks on Ethereum Smart Contracts", International Conference on Principles of Security and Trust, Dec. 2017, pp. 1-24.
Vitalik Buterin, "Thinking about Smart Contract Security", Jun. 19, 2016, pp. 1-89.
Lorenz Breidenbach, et al., "An In-Depth Look at the Parity Multisig Bug", Jul. 22, 2017, pp. 1-9.
Kevin Delmolino, et al., "Step by Step Towards Creating a Safe Smart Contract: Lessons and Insights from a Cryptocurrency Lab", International Conference on Financial Cryptography and Data Security, Dec. 2016, pp. 1-15.
Christoph Jentzsch, "The History of the DAO and Lessons Learned", Aug. 24, 2016, pp. 1-7.

* cited by examiner

METHOD AND SYSTEM FOR SECURING SMART CONTRACTS IN BLOCKCHAINS

CROSS-REFERENCE TO RELATED APPLICATION

Priority is claimed to U.S. Provisional Patent Application No. 62/578,581, filed on Oct. 30, 2017, the entire disclosure of which is hereby incorporated by reference herein.

FIELD

The present invention relates to a method and system for securing smart contracts in blockchains.

BACKGROUND

The massive adoption of Bitcoin has truly fueled innovation, and there are currently more than 500 alternate blockchains, most of which are simple variants of Bitcoin. Bitcoin unveiled a key-enabling technology and a hidden potential within the system: the blockchain. Indeed, the blockchain allows transactions, and any other data, to be securely stored and verified without the need of any centralized authority. The inventors have recognized that the blockchain community has been in search of a scalable distributed consensus protocol for a considerable amount of time.

Currently, a number of blockchains, such as Ethereum, provide a Turing-complete programming language to allow arbitrary applications referred to as smart contracts to be executed on the blockchain. For example, a basic Namecoin version for the Ethereum blockchain can be written with a few lines of code. Further, using the concept of smart contracts, creating subcurrencies only requires minimal programming effort. Another concrete use case of Ethereum is to build decentralized autonomous organizations (DAOs).

Smart contracts must be executed correctly as a necessary condition for their effectiveness. In the last few years, the blockchain community has witnessed a number of major vulnerabilities and major bugs within smart contracts. Vulnerabilities include re-entrancy problems, arrays/loops within the smart contracts, variable/function naming mixup, among others. These vulnerabilities have fueled interest in the community to conduct research on solutions dedicated to enhance the safety of smart contracts. Existing solutions range from better development environments to dedicated programming languages, formal verification and symbolic execution. However, the inventors have recognized that these existing solutions are still subject to vulnerabilities and do not provide adequate security.

SUMMARY

In an embodiment, the present invention provides a method for securing smart contracts in a blockchain. A contract creation transaction having a control flow graph (CFG) and contract code for a smart contract to be created is received in the blockchain. The contract creation transaction is verified by checking a signature of a creator of the smart contract and determining that the CFG is correct based on the contract code. The verified contract creation transaction is included as a block in a distributed ledger of the blockchain.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
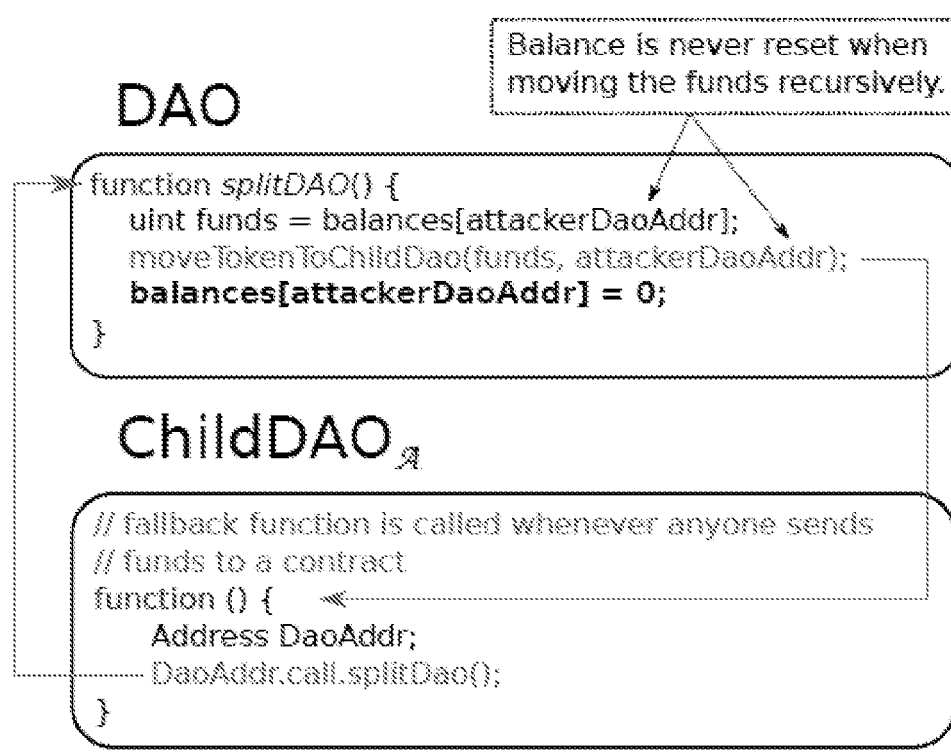
FIG. 1 illustrates an exploit of DAO.

In an embodiment, the present invention provides a new solution for enhancing the security of smart contracts that leverages control-flow integrity (CFI). The solution exploits CFI to enable run-time monitoring of smart contract execution. By this inventive solution, the CFI-based smart contract execution prevents exploitation of smart contract vulnerabilities and allows efficient transaction validation by means of state checking based on control-flow graphs (CFGs). Since the approach can be used to perform run-time validation of smart contract execution, it covers the actual execution flow of a smart contract. In contrast, schemes that build on offline static or dynamic analysis methods suffer from limited coverage as they neither fully cover nor anticipate the run-time behavior of a smart contract.

Embodiments of the present invention allow for dynamic analysis at run-time of smart contracts by replacing the logic of smart contracts with CFGs. Comparatively, formal verification and static analysis have severe limitations with regard to security.

In the following, some background information on smart contracts in Ethereum is provided and related work is discussed. Then, the system model according to an exemplary embodiment of the present invention is discussed, along with the solution based on CFI.

Ethereum provides a distributed platform for general computation via smart contracts. A smart contract is a piece of quasi-Turing-complete program in Ethereum Virtual Machine (EVM) code. The contract is deployed and replicated on Ethereum nodes through (blockchain) transactions. During contract creation, a new account is associated with the contract code and initialized with the internal storage; the balance of its virtual currency is Ether.

When a transaction is sent to the contract account, nodes will execute the contract in the local EVM, which is a stack-based virtual machine. The execution is driven by Gas, which defines the cost of executing each instruction on the blockchain. If some exception has occurred (including the out-of-gas exception), the state of the contract is reverted.

Since the release of Ethereum blockchain, many services are hosted in the blockchain network such as payment applications, games and crowd-funding projects. These services have successfully engaged the public participation for its transparency, but also increased interest in abusing the vulnerabilities of the smart contracts (e.g., to steal funds). For example, C. Jentzsch, "The History of the DAO and Lessons Learned" at <<https://blog.slock.it/the-history-of-the-dao-and-lessons-learned-d06740f8cfa5>> (last accessed Oct. 10, 2017) describes the notorious DAO attack which resulted in the theft of almost 60 million USD in June 2016.

K. Delmolino, et al., "Step by step towards creating a safe smart contract: Lessons and insights from a cryptocurrency lab," International Conference on Financial Cryptography and Data Security, pp. 79-94, Springer (2016) pointed out several pitfalls when implementing a smart contract. The paper shows that some logical mistakes in the contract program can result in a failure to capture the concurrency feature of the contracts hosted in a distributed system. For example, the attackers' capability to observe transactions in the network or withhold blocks to their own interests should be taken into account when programming a contract. The study also discussed the call-stack bug in the Ethereum Virtual Machine (EVM) level during internal transaction calls among the contracts. Since EVM call-stack is bounded with a fixed size of 1024, any further calls such as transferring Ether with send( ) function will be ignored. This feature can be exploited by an attacker who aims to have certain calls in a target contract to silently fail (i.e., without throwing exception). The attacker can achieve this by first repeatedly calling his self-controlled contracts right until the point when the target call will reach 1025 in the call-stack and thus being ignored.

Moreover, C. Reitwiessner, "Smart Contract Security," <<https://blog.ethereum.org/2016/06/10/smart-contract-security>> (last accessed Oct. 10, 2017) and ConsenSys, "Ethereum Contract Security Techniques and Tips"<<https://github.com/ConsenSys/smart-contract-best-practices>> (last accessed Oct. 10, 2017) describe that the Ethereum community is subject to a number of general pitfalls and best practices when programming contracts in Solidity, a high-level programming language that compiles the contracts to EVM code (see "Solidity," <<http://solidity.readthedocsio/en/latest/index>> (last accessed Oct. 10, 2017). It has been shown that even the process of sending funds can be exploited in many different ways. The discussion of pitfalls include a discussion of the bug that was exploited later in the DAO attack. Since function send( ) has a side effect of calling the fallback function of the recipient's contract, a malicious contract can invoke the fund-transferring function again in its fallback function. This side-effect is quite hidden and the contract can fall into the re-entrancy calls if not handled carefully. In fact, this implicit fallback function in EVM has recently caused another exploit in a well-known wallet contract called Parity and stolen 6 Million USD, as described in by L. Breidenbach, et al. <<http://hackingdistributed.com/2017/07/22/deep-dive-parity-bug>> (last accessed Oct. 10, 2017). In this attack, a function in the underlying library contract is triggered unexpectedly through the fallback function from the wallet contract.

After the DAO attack, V. Buterin, "Thinking About Smart Contract Security" <<https://blog.ethereum.org/2016/06/19/thinking-smart-contract-security>> (last accessed Oct. 10, 2017), N. Atzei, et al., "A survey of attacks on ethereum Online" International Conference of Principles of Security and Trust, pp. 164-186, Springer (2017) and L. Luu, et al., "Making smart contracts smarter," in Proceedings of the 2016 ACM SIGSAC Conference on Computer and Communications Security, pp. 254-269, ACM (2016) have investigated the existing vulnerabilities of the published smart contracts. The discovered bugs suggest subtle gaps in the understanding of the distributed semantics of the underlying platform. To amend this gap, L. Luu et al., which is hereby incorporated by reference herein, propose the following enhancement of the operational semantics of the Ethereum contracts:

Guarded transaction: Transactions can specify an execution condition and they will only be executed if the current global state on the validating nodes fulfils the condition. This condition is able to prevent inconsistent execution caused by transaction-order dependency in a distributed environment with concurrent transactions.

Deterministic timestamp: This proposed fix provides block index instead of block timestamp as a data source for the contracts. This prevents the attackers from manipulating the timestamp within an acceptable window in order to influence the contract execution results.

Consistent and explicit exception handling: In order to enforce atomicity, Solidity is suggested to automatically propagate all exceptions at the level of EVM from the callee to caller regardless of different calling instructions. In addition, all exceptions should be explicitly handled to avoid silent failures that do not align with the programmers' expectations.

Additionally, Luu et al. also provide a tool "Oyente" to find potential security bugs in the contracts. Oyente uses Symbolic Execution, which is discussed by J. C. King, "Symbolic execution and program testing," Communications of the ACM, vol. 19, no. 7, pp. 385-394 (1976), to evaluate the execution path given the contract bytecode and the current Ethereum global state, and try to find a match with the identified vulnerabilities.

In addition, there are new challenges for "mutable" contracts. While the immutability of deployed contracts is a limitation for contract update or bug fixing, new contracts are structured as a compound of linked libraries. The entry-point contracts have fixed addresses and only define public application programming interfaces (APIs) and store the addresses of the library contracts. The transaction invocations are forwarded to the library contracts where the actual functionalities are implemented. Therefore, updating contracts can be achieved by deploying new libraries and updating their addresses in the entry-point contracts. Although this approach solves the problem of contract updating, it also brings challenges with varying control flows of the contracts. M. Froewis, et al., "In code we trust?," Data Privacy Management, Cryptocurrencies and Blockchain Technology, pp. 357-372, Springer (2017) discovered that 87% of the contracts have dependencies on other contracts and 54% of the contracts are mutable, i.e., they call other contracts without hard-coded addresses and thus the control flow varies depending on the input transactions as well as the current global state in the blockchain.

DAO (see C. Jentzsch, "Decentralized autonomous organization to automate governance," <<https://download.slock.it/public/DAO/WhitePaper.pdf>> (last accessed Oct. 10, 2016)) is an Ethereum contract written in Solidity. It allows the stakeholders of DAO to propose projects, as well as vote and execute the proposals. During the creation phase, the contract first issues DAO tokens in exchange of ether to collect funds from stakeholders. The token grants its holder voting and ownership rights for the proposed projects (represented by other Ethereum contracts) under the framework of DAO. Once a proposal is approved, the token holders are able to cast votes on the proposal, which will be executed once there are enough votes when the proposal period is passed.

In the contract, DAO also allows any stakeholder to propose a new DAO contract childDAO and transfer his tokens to that contract. This mechanism aims to protect the rights of the minority stakeholders and allow them to leave the organization. However, the function that implements this process in the coded contract is not carefully written and therefore was exploited by the attacker, who managed to drain 3.5 M Ether from DAO on Jun. 18, 2016.

The attacker is a stakeholder who owns some tokens in DAO. The attacker first proposed a malicious contract childDAO$_A$ to DAO. Though the proposal underwent one week of debate period, it was not checked carefully by other stakeholders and easily got approved. Following the protocol, the split-DAO function was invoked which moves the attacker's tokens from DAO to childDAO$_A$. This fund-sending process automatically triggers a fallback function in childDAO$_A$. A fallback function of a contract is called whenever the contract receives some funds. The attacker took advantage of this feature to reenter the splitDAO again inside the fallback function of childDAO$_A$, thus leading to a recursive call to repeatedly move the attacker's tokens from the DAO contract to his childDAO$_A$ contract. Since the balance of the attacker's account in DAO is only reset after the exploited recursive call, DAO constantly sends the same amount of tokens to the attacker (i.e., the childDAO$_A$ contract that the attacker owns). FIG. 1 demonstrates the exploit used by the attacker by crafting a special child DAO contract. Although there is a gas limit to prevent an infinite loop in Ethereum, the attacker can calculate the number of allowed re-entrance calls. Moreover, the cost of gas that the attacker pays for this exploitation transaction is negligible compared to what the attacker is able to over-withdraw from DAO.

In fact, writing secure smart contract in Solidity is quite challenging and not intuitive. As a result, the smart contracts often behave in a way that the programmer does not expect. C. Reitwiessner, "Smart contract security," (2016) <<https://blog.ethereum.org/2016/06/10/smart-contract-security>> (last accessed Oct. 10, 2017) describes the typical pitfalls of writing a smart contract. For example, sending Ether to an account inside a procedure is often a bad practice, as the attacker can always make the payment fail and thus manipulate the behavior of the contract. It can be beneficial, for example, for the attacker to make the payment fail as the attacker can prevent the others from outbidding the attacker in an auction contract. Instead, it should be the recipient who initiates the payout in a separate call. Additionally, mutex should be used to prevent re-entrance into a block, or otherwise the balance should be updated before sending the ether. V. Buterin has listed some very popular contracts in Ethereum that are actually vulnerable. Another challenge lies in that it is difficult to upgrade the contracts, as they are immutable once deployed in the blockchain. In fact, the vulnerability in DAO was discovered and discussed in public before the attack was executed. While the programmers were working on fixing the problems, the attacker first launched the attack based on the discovered vulnerability.

Software exploits remain one of the most prevalent attack vectors against software programs. The continued success of these attacks can be attributed to the fact that large portions of software programs are implemented in type-unsafe languages that do not enforce bounds checking on data inputs. One of the most promising defense mechanisms against software exploits is the enforcement of CFI. The main idea of CFI is to derive an application's CFG prior to execution, and then monitor its run-time behavior to ensure that the control-flow follows a legitimate path of the CFG. Basically, the CFG represents valid execution paths the program may follow while it is executing. It consists of basic blocks (BBLs), instruction sequences with a single entry, and exit instruction (e.g., return, call, or jump), where the exit instruction enables the transition from one BBL to another. Any deviation from the CFG leads to a CFI exception and subsequent termination of the application. This is achieved by checking branch instructions of the BBLs: such instructions are overwritten with a new block of instructions that validates if the branch instruction targets a valid execution path in the CFG.

M. Abadi, et al., "Control-flow integrity: Principles, implementations, and applications," ACM Trans. Inf. Syst. Secur., vol. 13, no. 1 (2009), which is hereby incorporated by reference herein, discuss the software security concept CFI which enforces that the execution flow of an application always follows a legitimate path in the application's CFG. N. Burow, et al., "Control-flow integrity: Precision, security, and performance," ACM Comput. Surv., vol. 50, pp. 16:1-16:33 (April 2017) show that CFI has become a hot topic of research and many schemes have been proposed in the last few years. However, prior to the present invention, CFI enforcement has never been considered in the context of distributed programming networks such as blockchains, for example to secure smart contract execution.

In particular, according to embodiments of the present invention, a novel solution is provided that leverages the CFG of a smart contract to detect attacks on smart contract execution. For enforcing CFI in the context of blockchains, embodiments of the present invention develop support for context-sensitive monitoring. Specifically, it is provided that CFI enforcement considers the state of the blockchain and the current transaction to decide whether a CFG path is legitimate. For instance, in the case of the DAO attack, the attacker repeatedly re-enters the splitDAO function before the previous entries have terminated and updated the account balance. Hence, the CFG and the current CFG state of a smart contract execution (e.g., the state of execution within the splitDAO function) allows detection and prevention of such attacks.

In the following discussion of an exemplary embodiment, a distributed blockchain network similar to Ethereum is assumed. Namely, it is assumed that transactions are ordered and replicated on the distributed ledger among the blockchain nodes through the underlying consensus protocol. Similarly, smart contracts are replicated to the nodes via the contract creation transactions, and contract invocation and state update are achieved via transaction calls. It is assumed that the contract code C has an associated address Addr$_c$ and an internal storage with state S$_c$. A contract also provides multiple interfaces ($f_0^c$, $f_1^c$, ..., $f_m^c$) where $f_0^c$ is a fallback function that will be called if there is no function signature match in the invoking transactions. During contract execution, a contract is able to invoke another contract which is also on the ledger until a limited amount of inter-contract calls N is reached.

From the point of view of contract deployment and invocation, the roles of the blockchain nodes are defined as "contract creators" and "contract validators." The blockchain nodes are each computer devices or systems comprising, for example, one or more servers, computer processors, memory devices, etc. A contract creator is the originator of a contract who defines its legitimate execution path. Given the bytecode of the contract, a CFG can be derived for each (conditioned) jump or call among the basic blocks. This static graph can already prevent the execution flow being hijacked by an attacker (e.g., an invalid jump from block A to block B which does not exists in the CFG). In addition, with dynamic input data, the contract creator can derive the path of expected execution flows and add labels in the CFG to mark such conditions (e.g., jump to block X always preludes a jump to block Y; if such condition is not observed in the execution, it could be determined that a vulnerability is exploited). A contract validator is a validating node who maintains the distributed ledger and thus executes contracts upon transaction calls.

Embodiments of the present invention provide a new approach of contract execution in a distributed environment. The aim of the blockchain is not to execute contracts, but rather to order and validate the transactions and update the state accordingly. Contract execution is just one way to achieve this purpose.

Therefore, in the solution according to embodiments of the present invention, instead of executing the contracts on each contract validator in the network that may lead to an unexpected state by malicious transactions, the contract validators only validate the transactions by evaluating the triggered execution path in the corresponding contracts. The contract creator first defines the genuine CFG of the contract and deploys it along with the smart contract into the blockchain. Upon reception, the contract validators verify the correctness of the CFG based on the contract code and instantiate the smart contract accordingly. Then, for future incoming transactions, the contract validators only verify them by checking whether they pass all the expected checkpoints in the CFG; otherwise, the contract validators broadcast a proof of execution violation to other nodes in order to invalidate the transaction.

Figure 2:
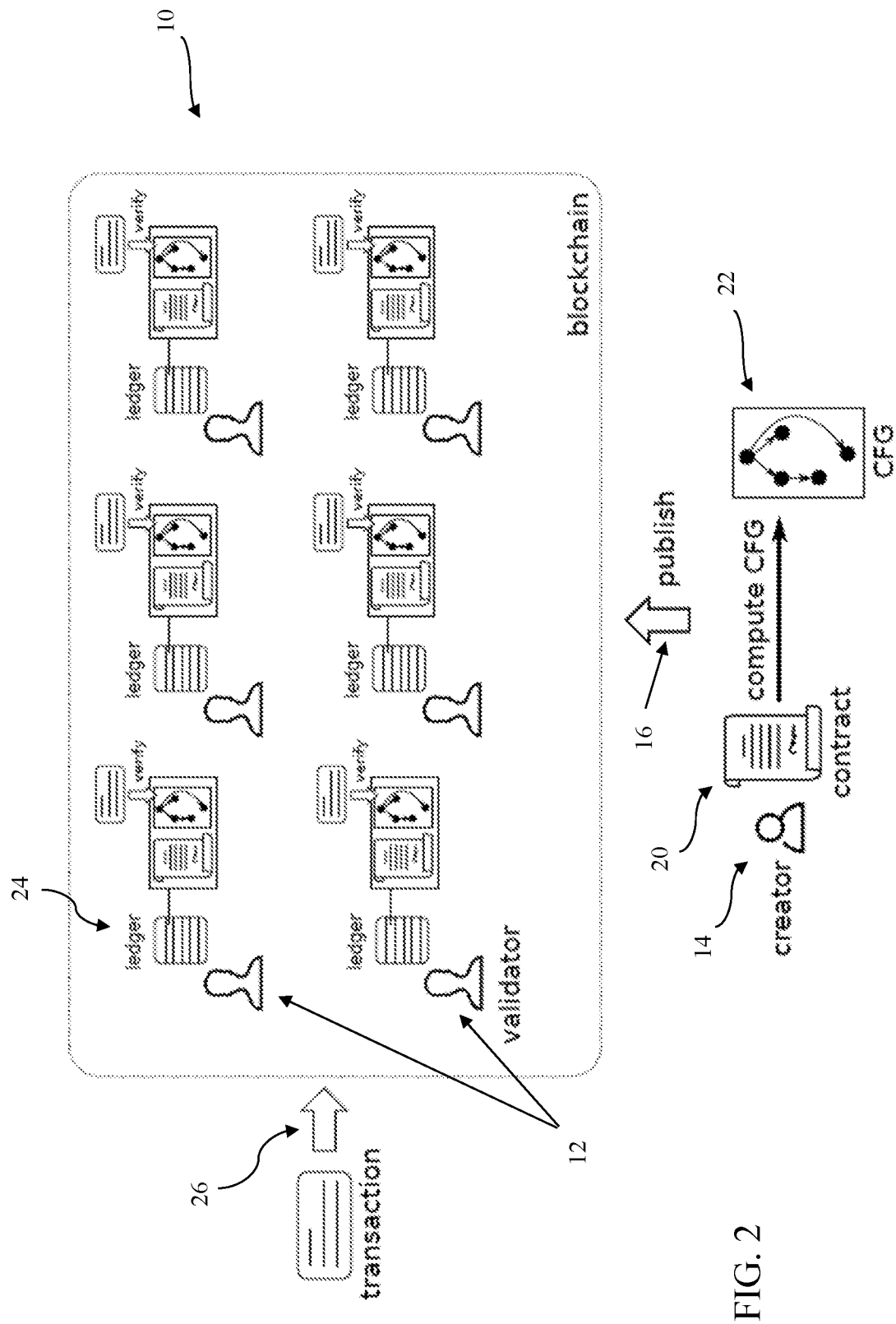
FIG. 2 schematically shows a blockchain architecture in accordance with an embodiment of the present invention with contract validators deployed with CFG of the of the smart contracts.

FIG. 2 schematically illustrates a method and system according to embodiments of the invention implementing the solution. In particular, a blockchain architecture 10 is shown with contract validators 12 deployed with CFG 22 of the smart contracts 20. The contract creator 14 deploys both the contract code and its genuine CFG 22 via a transaction call 16 to the blockchain. All contract validators 12 in the blockchain network accept this deployment transaction, also referred to herein as a contract creation transaction, only if the signature is valid and the CFG 22 is correct. A contract account is subsequently created and the validated CFG 22 is associated with the account in addition to the original contract code by adding the contract creation transaction to the distributed ledger 24. Alternatively, in some applications, the contract creator 14 only needs to distribute the validated CFG 22 (without sending the actual contract). Here, the CFG 22 is used to prevent unexpected execution paths that are triggered by malicious transactions through exploits. In particular, the CFG 22 captures the valid execution flows of the smart contract 20, and allows contract validators 12 to determine whether the current execution state of the smart contract 20 during a subsequent transaction call 26 invoking a function in the smart contract 20 matches the CFG, and thereby detect any malicious and abnormal smart contract execution flows.

Figure 3:
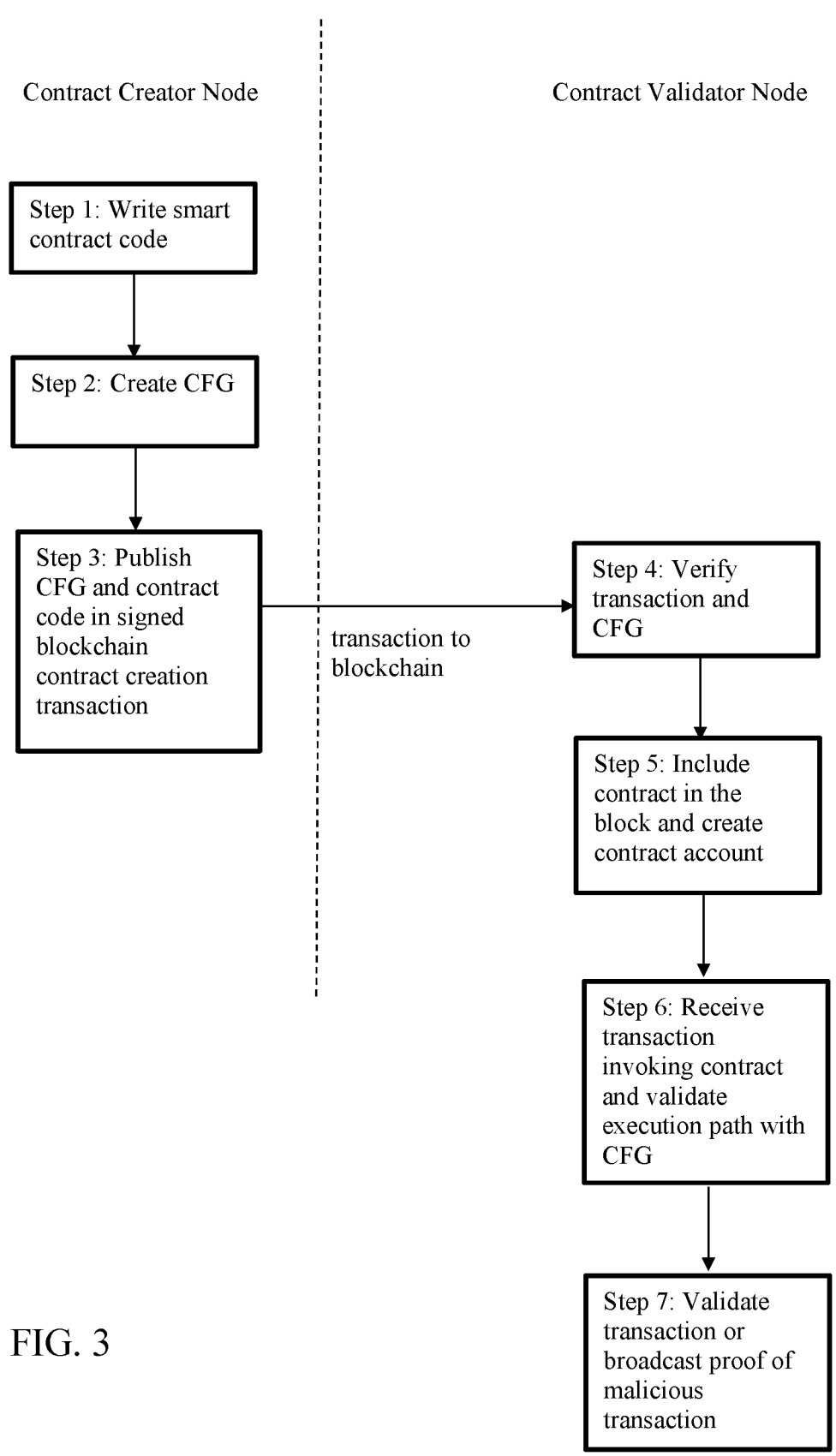
FIG. 3 is a flow chart of a method according to an embodiment of the present invention.

According to an embodiment of the method for securing smart contracts in a blockchain illustrated in FIG. 3, the following steps are performed:

1. Contract creator writes the smart contract code.
2. Contract creator creates CFG of the contract given a dynamic input and state into the contract code which provides a particular execution path.
3. Contract creator publishes the contract code along with the CFG in a signed blockchain transaction.
4. Contract validators verify the received contract creation transaction created from the previous step by checking the creator's signature and verifying the correctness of the CFG given the contract code from which the CFG is derived. With a tested input and state, it is also possible to add labels in the static CFG to specify certain conditions.
5. If the above verification is successful, the contract is included in the block and saved to the ledger. A contract account is created subsequently on the blockchain by the contract validators with associated contract code, CFG, state and other contract account information. The state is updated by the contract validators after each transaction invoking the smart contract.
6. Whenever a transaction is sent to the contract account to invoke a function in the contract, the contract validators validate the transaction by calculating its execution path and comparing it with the associated CFG.
7. If the execution path matches the CFG, the transaction is validated and will be included in the block; otherwise, the invalid execution path will be broadcast into the blockchain as a proof of malicious transaction. If a contract validator first receives the transaction, it performs the above step; if the contract validator first receives the malicious transaction proof, it verifies and forwards the proof.

To assess the feasibility of the solution according to embodiments of the present invention, statistics from the existing contracts were used to estimate the average size of the contract code (both the lines of source code and opcode) since it is usually difficult to create CFG for large programs. All verified contracts were crawled in Ethereum via Etherscan.io, whose source code is published and verified against the deployed contract bytecode on the ledger. Among 4,515 verified contracts by Sep. 26, 2017, the average size of code is 324 lines while the largest contract has 2,524 lines of code. In terms of number of opcode, it is possible to have an average of 2,389 and maximum 13,290 opcodes in embodiments of the present invention. Specifically, the opcodes are checked that affect the size of the CFG, such as JUMP and CALL. The findings listed in Table 1 below shows that on average 36.9% of the instructions in a contract are JUMP or conditional jump JUMPI instructions; less than 3.5% of the instructions invoke inter-contract calls.

TABLE 1

Statistics extracted from currently verified contracts in Ethereum.

| Count | Average | Max. |
| --- | --- | --- |
| Verified contracts | 4514 | — |
| Source code lines | 324 | 2,594 |
| Opcode instructions | 2,389 | 13,290 |
| JUMP | 57 | 289 |
| JUMPI | 74 | 642 |
| CALL | 4 | 89 |
| CALLCODE | 0.09 | 54 |
| RETURN | 11 | 67 |

Accordingly, the initial results show that the current sizes of smart contracts are well suited for CFG-based analysis, which is suitable for up to thousands of branches created by calls and jumps.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for securing a blockchain, maintained by a blockchain network, against software exploits, the method comprising:
   automatically receiving, by a blockchain node of the blockchain network, blockchain data comprising: (i) a control flow graph (CFG) and (ii) a machine-executable application code, the CFG defining a set of pre-defined execution flows of the machine-executable application code;
   deriving, at run-time, valid execution flows from the machine-executable application code;
   automatically verifying, at run-time, the blockchain data by verifying a digital signature of a creator of the machine-executable application code and verifying that the CFG itself is correct by confirming that the set of pre-defined execution flows defined by the CFG corresponds to the valid execution flows derived from the machine-executable application code; and
   based on verifying the blockchain data, automatically including the verified blockchain data in a block of the blockchain.

2. The method according to claim 1, further comprising:
   receiving subsequent blockchain data invoking at least one function of the machine-executable application code of the blockchain data previously verified and included in the blockchain;
   determining a currently invoked execution path of the machine-executable application code invoked by the subsequent blockchain data; and
   comparing the currently invoked execution path of the machine-executable application code to the set of pre-defined execution flows defined by the CFG, and based thereon, performing one of the following steps:
      validating a blockchain transaction, which is at least partially defined by the subsequent blockchain data, where the comparison results in a determination that the currently invoked execution path matches at least one of the set of pre-defined execution flows defined by the CFG, the validated blockchain transaction being then incorporated into another block of the blockchain; and
      broadcasting a proof of malicious transaction to the blockchain network where the comparison results in a determination that the currently invoked execution path does not match with any of the set of pre-defined execution flows defined by the CFG.

3. The method according to claim 2, wherein the machine-executable application code corresponds to a quasi-Turing-complete program in Ethereum Virtual Machine code, and wherein the CFG, the machine-executable application code and a state of execution of the quasi-Turing-complete program are stored in the block of the blockchain.

4. The method according to claim 3, further comprising updating the state after the execution of the quasi-Turing-complete program upon validating the blockchain transaction.

5. The method of claim 1, wherein the CFG comprises a plurality of basic building blocks (BBLs) and each BBL includes a single entry instruction and a single exit instruction enabling a transition from a respective BBL to another one of the BBLs.

6. The method according to claim 1, further comprising generating, by the creator of the smart contract, the CFG based on the machine-executable application code given a dynamic input and state.

7. A system for securing a blockchain, maintained by a blockchain network, against software exploits, the system comprising one or more processors which, alone or in combination, are configured to provide for execution of the following steps:
   automatically receiving, by a blockchain node of the blockchain network, blockchain data comprising (i) a control flow graph (CFG) and (ii) a machine-executable application code, the CFG defining a set of pre-defined execution flows of the machine-executable application code;
   deriving, at run-time, valid execution flows from the machine-executable application code;
   automatically verifying, at run-time, the blockchain data by verifying a digital signature of a creator of the machine-executable application code and verifying that the CFG itself is correct by confirming that the set of pre-defined execution flows defined by the CFG corresponds to the valid execution flows derived from the machine-executable application code; and
   based on verifying the blockchain data, automatically including the blockchain data in a block of the blockchain.

8. The system according to claim 7, being further configured to provide for execution of the steps of:
   receiving subsequent blockchain data invoking at least one function of the machine-executable application code of the blockchain data previously verified and included in the blockchain;
   determining a currently invoked execution path of the machine-executable application code invoked by the subsequent blockchain data; and
   comparing the currently invoked execution path of the machine-executable application code to the set of pre-defined execution flows defined by CFG, and based thereon, performing one of the following steps:
      validating a blockchain transaction, which is at least partially defined by the subsequent blockchain data, where the comparison results in a determination that the currently invoked execution path matches at least one of the set of pre-defined execution flows defined by the CFG, the validated blockchain transaction being then incorporated into another block of the blockchain; and
      broadcasting a proof of malicious transaction to the blockchain network where the comparison results in a determination that the currently invoked execution path does not match with any of the set of pre-defined execution flows defined by the CFG.

9. The system according to claim 8,
wherein the machine-executable application code corresponds to a quasi-Turing complete program in Ethereum Virtual Machine code, and
wherein the system is further configured to provide for execution of the step of storing the CFG, the machine-executable application code and a state of execution of the quasi-Turing complete program in the block of blockchain.

10. The system according to 9, being further configured to provide for execution of the step of updating the state after execution of the quasi-Turing complete program upon validating the blockchain transaction.

11. A tangible, non-transitory computer-readable medium having instructions thereon which, when executed by one or more processors, cause execution of a method for blockchain, maintained by a blockchain network, against software exploits, the method comprising:
automatically receiving, by a blockchain node of the blockchain network, blockchain data comprising: (i) a control flow graph (CFG) and (ii) machine-executable application code, the CFG defining a set of pre-defined execution flows of the machine-executable application code;
deriving, at run-time, valid execution flows from the machine-executable application code;
automatically verifying, at run-time, the blockchain data by verifying a digital signature of a creator of the machine-executable application code and verifying that the CFG itself is correct by confirming that the set of pre-defined execution flows defined by the CFG corresponds to the valid execution flows derived from the machine-executable application code; and
based on verifying the blockchain data, automatically including the verified blockchain data in a block of the blockchain.

12. The computer-readable medium according to claim 11, having instructions thereon which, when executed by the one or more processors, cause execution of the following additional steps:
receiving subsequent blockchain data invoking at least one function of the machine-executable application code of the blockchain data previously verified and included in the blockchain;
determining a currently invoked execution path of the machine-executable application code invoked by the subsequent blockchain data; and
comparing the currently invoked execution path of the machine-executable application code to the set of pre-defined execution flows defined by the CFG, and based thereon, performing one of the following steps:
validating a blockchain transaction, which is at least partially defined by the subsequent blockchain data, where the comparison results in a determination that the currently invoked execution path matches at least one of the set of pre-defined execution flows defined by the CFG; and
broadcasting a proof of malicious transaction to the blockchain network where the comparison results in a determination that the currently invoked execution path does not match with any of the set of pre-defined execution flows defined by the CFG.

13. The method of claim 1, further comprising:
receiving subsequent blockchain data after the blockchain data; and
verifying the subsequent blockchain data based on the CFG and without direct reference to the machine-executable application code.

14. The method of claim 1, wherein the CFG defines all legitimate execution paths of the machine-executable application code, and wherein the machine-executable application code comprises a definition of an exploitable execution pathway that is prohibited by the CFG.

15. The method of claim 1, comprising:
receiving subsequent blockchain data invoking a function set out in the machine-executable application code to thereby cause a transition from a previous execution state of a program corresponding to the machine-executable application code to a subsequent execution state;
determining, at run-time, whether the CFG permits the transition from the previous execution state to the subsequent execution state; and
in response to determining that the CFG prohibits the transition from the previous execution state to the subsequent execution state, rejecting the subsequent transaction.

16. The method according to claim 5, wherein the CFG further comprises a label marking a condition in an expected execution path given a dynamic input.

17. The method of claim 1, wherein the CFG is derived from the machine-executable application code, and the method further comprises:
receiving subsequent blockchain data referencing the machine-executable application code and exploiting an execution path in the machine-executable application code; and
rejecting the subsequent data based on determining that the CFG prohibits the exploitable execution path.

18. The computer-readable medium according to claim 11, having instructions thereon which, when executed by the one or more processors, cause execution of the step of generating the CFG based on the machine-executable application code given a dynamic input and state.

19. The method of claim 2,
wherein the blockchain data corresponds to a blockchain transaction, the machine-executable contract code defines a Smart-Contract, and the subsequent blockchain data defines a subsequent blockchain transaction,
wherein the method further comprises determining, at run-time from the subsequent blockchain data, an execution condition for the machine-executable contract code;
wherein the determining of the currently invoked execution path is based upon the determined execution condition and a state of the blockchain, the determining of the currently invoked execution path occurring during run-time execution of the machine-executable application code, and
wherein the comparing the currently invoked execution path to the set of pre-defined execution flows comprises checking branch instructions of basic building blocks of the CFG.

20. The method of claim 1, wherein the deriving of the valid execution flows comprises deriving a comparison CFG from bytecode of the machine-executable application code for each conditioned jump or call among basic blocks of the CFG.

* * * * *